(12) United States Patent
Singh et al.

(10) Patent No.: US 10,365,139 B2
(45) Date of Patent: Jul. 30, 2019

(54) UNIVERSAL DISPENSER MONITOR

(71) Applicant: Smart Wave Technologies, Inc., Bethesda, MD (US)

(72) Inventors: Gavin Singh, Maple (CA); Volodimir Bondarenko, Mississauga (CA)

(73) Assignee: Smart Wave Technologies, Inc., Bethesda, MD (US)

( * ) Notice: Subject to any disclaimer, the term of this patent is extended or adjusted under 35 U.S.C. 154(b) by 0 days.

(21) Appl. No.: 15/710,949

(22) Filed: Sep. 21, 2017

(65) Prior Publication Data

US 2018/0080807 A1 Mar. 22, 2018

Related U.S. Application Data

(60) Provisional application No. 62/397,741, filed on Sep. 21, 2016.

(51) Int. Cl.

| | |
|---|---|
| *G01F 9/00* | (2006.01) |
| *H04L 29/08* | (2006.01) |
| *A47K 5/12* | (2006.01) |
| *G01F 23/00* | (2006.01) |
| *A47K 7/04* | (2006.01) |
| *G06N 20/00* | (2019.01) |
| *G06F 16/00* | (2019.01) |
| *E03D 9/08* | (2006.01) |
| *A47K 10/32* | (2006.01) |

(52) U.S. Cl.
CPC ............ *G01F 9/001* (2013.01); *A47K 5/1217* (2013.01); *G01F 23/0007* (2013.01); *H04L 67/12* (2013.01); *A47K 7/046* (2013.01); *A47K 2010/3226* (2013.01); *E03D 9/08* (2013.01); *E03D 2201/00* (2013.01); *G06F 16/00* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 5,454,406 A | * | 10/1995 | Rejret | B67D 1/1213 137/624.12 |
| 5,500,050 A | * | 3/1996 | Chan | A47L 15/0055 134/18 |
| 5,608,643 A | | 3/1997 | Wichter et al. | |
| 5,691,919 A | * | 11/1997 | Gemmell | A47K 10/36 242/563 |

(Continued)

OTHER PUBLICATIONS

International Search Report & Written Opinion of the International Searching Authority Application No. PCT/CA2017/051098 Completed Date: Nov. 22, 2017; dated Dec. 15, 2017 7 pages.

*Primary Examiner* — Curtis J King (74) *Attorney, Agent, or Firm* — Whitmyer IP Group LLC (57) ABSTRACT

A retrofit dispenser monitor is disclosed. The dispenser monitor has a connector allowing it to be connected directly to one of a number of dispensers. The dispenser monitor also comprises a sensor configured to detect the dispensing action of the attached dispenser by learning the characteristics of the dispensing action. Information corresponding to the dispensing action is then transmitted to a remote location which allows the use of the dispenser to be monitored.

20 Claims, 4 Drawing Sheets

(56) References Cited

U.S. PATENT DOCUMENTS

| | | | | |
|---|---|---|---|---|
| 5,695,091 | A * | 12/1997 | Winings | A47K 5/1217 222/1 |
| 6,203,187 | B1 * | 3/2001 | Abbasi | B01F 3/0865 137/3 |
| 6,299,020 | B1 * | 10/2001 | Sudolcan | B67D 1/1243 222/1 |
| 6,352,176 | B1 * | 3/2002 | Hartsell, Jr. | B67D 7/085 222/1 |
| 6,360,181 | B1 * | 3/2002 | Gemmell | A47K 5/1202 340/675 |
| 6,375,038 | B1 * | 4/2002 | Daansen | A47K 5/1217 222/39 |
| 6,411,920 | B1 * | 6/2002 | McConnell | A47K 10/42 242/564.1 |
| 6,839,644 | B1 | 1/2005 | Woods et al. | |
| 6,958,691 | B1 * | 10/2005 | Anderson | A61B 5/0002 340/539.12 |
| 7,405,653 | B2 | 7/2008 | Tice et al. | |
| 7,825,813 | B2 | 11/2010 | Farhan | |
| 7,999,686 | B2 | 8/2011 | Kennish et al. | |
| 8,311,765 | B2 * | 11/2012 | Nielsen | B65D 83/203 702/130 |
| 8,364,546 | B2 | 1/2013 | Yenni et al. | |
| 8,847,752 | B2 | 9/2014 | Wegelin et al. | |
| 8,970,391 | B2 | 3/2015 | Hoekstra | |
| 9,875,903 | B2 * | 1/2018 | Shreve | H01L 21/28556 |
| 2002/0175182 | A1 * | 11/2002 | Matthews | A47K 5/1217 222/52 |
| 2004/0124988 | A1 * | 7/2004 | Leonard | B05B 11/0054 340/612 |
| 2005/0087255 | A1 * | 4/2005 | Humphrey | A47G 19/2227 141/94 |
| 2005/0171634 | A1 * | 8/2005 | York | A47K 5/06 700/231 |
| 2006/0005312 | A1 * | 1/2006 | Reddy | A47K 13/24 4/668 |
| 2006/0030953 | A1 * | 2/2006 | Cantrell | G05B 23/0267 700/17 |
| 2007/0229288 | A1 * | 10/2007 | Ogrin | G01F 11/006 340/573.1 |
| 2008/0019489 | A1 * | 1/2008 | Lynn | A47K 5/12 379/93.01 |
| 2008/0019490 | A1 * | 1/2008 | Lynn | G07F 9/02 379/93.01 |
| 2008/0021779 | A1 * | 1/2008 | Lynn | G06Q 20/206 705/14.65 |
| 2009/0114041 | A1 * | 5/2009 | Harish | G06Q 10/087 73/862.626 |
| 2009/0195385 | A1 * | 8/2009 | Huang | G08B 21/245 340/572.1 |
| 2009/0201178 | A1 * | 8/2009 | Nielsen | G01C 15/02 340/988 |
| 2009/0204256 | A1 * | 8/2009 | Wegelin | B05B 11/30 700/244 |
| 2009/0315702 | A1 | 12/2009 | Cohen Alloro et al. | |
| 2010/0051637 | A1 * | 3/2010 | Shu | A47K 5/1217 221/9 |
| 2010/0134296 | A1 * | 6/2010 | Hwang | A47K 5/1217 340/573.1 |
| 2010/0282773 | A1 * | 11/2010 | Lynn | G08B 21/245 222/1 |
| 2011/0108570 | A1 | 5/2011 | Jarisch et al. | |
| 2013/0015956 | A1 * | 1/2013 | Wegelin | G07C 1/10 340/10.1 |
| 2013/0033376 | A1 * | 2/2013 | Seyed Momen | G01S 1/70 340/539.11 |
| 2013/0096729 | A1 * | 4/2013 | Wegelin | H03K 17/941 700/296 |
| 2013/0099900 | A1 * | 4/2013 | Pulvermacher | A47K 5/1217 340/10.42 |
| 2013/0099929 | A1 * | 4/2013 | Ophardt | A47K 5/1217 340/573.1 |
| 2013/0175291 | A1 * | 7/2013 | Wegelin | A47K 5/1217 222/23 |
| 2013/0240554 | A1 * | 9/2013 | Strahlin | A47K 10/24 221/1 |
| 2013/0248559 | A1 * | 9/2013 | Feriani | A61M 11/00 222/52 |
| 2013/0289765 | A1 * | 10/2013 | Saffran | A47K 10/32 700/237 |
| 2014/0197194 | A1 * | 7/2014 | Wegelin | A47K 5/1205 222/38 |
| 2014/0225732 | A1 * | 8/2014 | Limbert | G16H 40/20 340/540 |
| 2015/0178654 | A1 | 6/2015 | Glasgow et al. | |
| 2015/0207275 | A1 | 7/2015 | Wegelin et al. | |
| 2015/0223646 | A1 * | 8/2015 | Wegelin | A47K 5/1211 222/1 |
| 2015/0291314 | A1 * | 10/2015 | Wegelin | B65D 25/20 222/23 |
| 2015/0310606 | A1 * | 10/2015 | Shreve | H04N 7/181 382/103 |
| 2016/0092851 | A1 * | 3/2016 | De Berg Hewett | B67D 1/0877 705/15 |
| 2016/0274596 | A1 * | 9/2016 | Buell | A47K 5/12 |
| 2016/0325867 | A1 * | 11/2016 | Trundle | G08B 13/08 |
| 2017/0112335 | A1 * | 4/2017 | Diamond | A47K 10/34 |
| 2017/0134887 | A1 * | 5/2017 | Wegelin | H04L 67/26 |
| 2017/0190565 | A1 * | 7/2017 | Proper | B67D 7/0294 |
| 2018/0206682 | A1 * | 7/2018 | Robinson | A47K 5/1217 |
| 2018/0310780 | A1 * | 11/2018 | Mahaffey | G01H 17/00 |

* cited by examiner

UNIVERSAL DISPENSER MONITOR

This application claims priority from U.S. provisional application No. 62/397,741 filed on Sep. 21, 2016 by Smart Wave Technologies Corp. This priority application is hereby incorporated by reference in its entirety.

BACKGROUND

Field of the Invention

The invention relates to dispensers. In particular, the invention relates to dispenser monitors.

Background

Currently, if there are a number of dispensers (e.g. in a washroom with multiple soap dispensers and multiple paper towel dispensers) and monitoring is desired then new dispensers generally have to be monitored with the monitoring technology built in. However, this is expensive and wasteful. It would be advantageous if existing dispenser could be used and their use monitored.

U.S. Pat. No. 6,839,644 (Woods et al.) discloses a system for monitoring a plumbing system having a plurality of fixtures includes a sensor vibrationally coupled to the plumbing system and a processor. The sensor detects a vibration produced by the plumbing system, and generates a signal representative of the vibration. The processor receives the signal, compares the signal to a signal database that associates each of a plurality of stored signals with operation of one or more of the fixtures, and determines that the associated fixture or group of fixtures has been operated based on the comparison. The processor also stores a record of the operation of the associated fixture or group of fixtures.

U.S. Pat. No. 7,405,653 (Tice et al.) discloses a residential monitoring system incorporates both physiological sensors and activity sensors. Some of the sensors can be in wireless communication with control circuitry.

U.S. Pat. No. 7,825,813 (Farhan) discloses microprocessor technology used to detect routine sounds in a substantially enclosed environment to determine normal or abnormal activity or noise within the environment (i.e., habitual behavior of an individual) A device is situated in a substantially enclosed environment with audio input device similar to a microphone and an optional visual display for interaction with the local users. The device has the ability to be controlled locally via key-pad or USB port connected to a local laptop computer, or remotely via a phone line or Ethernet connection to internet. The device further performs audio pattern recognition using waveform matching scheme to detect the occurrence of pre-programmed sounds representing routine activities. The microprocessor counts the number occurrence of each recognizable sound for a particular interval and over a length of a day or other duration and reports to a remote server.

U.S. Pat. No. 7,999,686 (Kennish et al.) relates to an interactive packaging system for monitoring the usage of personal hygiene products, personal hygiene product packages, and restroom facilities. The interactive packaging system may include a plurality of usage monitoring devices each configured to detect physical stimulus associated with the usage of the product, package or facility with which the usage monitoring device is associated, and to transmit usage messages containing information relating to the detected physical stimulus. The interactive packaging system may further include a base station configured to receive the usage messages transmitted by the plurality of usage monitoring devices.

U.S. Pat. No. 8,364,546 (Yenni et al.) discloses a restroom monitoring system for monitoring attributes of fixtures within a restroom using sensors. Additional attributes are determined from the monitored attributes. Consumable usage levels are estimated based on predetermined consumption levels associated with usage states of the fixtures. The restroom monitoring system provides an indication of the need for replenishment of consumables based on the monitored attributes of the fixtures.

U.S. Pat. No. 8,970,391 (Hoekstra) discloses toilet management systems and methods. In an example system, a central monitoring component compiles usage information from sensors stationed at multiple toilet units and compiles a report of usage patterns. The usage patterns are networked to potential users via a user interface available on a webpage or mobile communications device.

US 2015/0178654 (Glasgow et al.) discloses methods and systems for managing an inventory. A database may store information regarding items owned by a user. The information regarding an item may include a quantity owned and one or more triggering events. Based on the occurrence of a triggering event, an order for the item may be placed without user intervention. Data to the database may be provided by one or more sensors. Triggering events may be defined in terms of sensor data. The triggering event may be defined by a user or through machine learning.

US 2015/0207275 (Wegelin et al.) discloses techniques and systems are provided for providing power and/or communication to a device, such as a dispenser, a flush valve of a bathroom device, a hygiene opportunity measurement device, a hands free faucet, etc. For example, the device may send current device statuses, usage metrics, and/or other information to a remote source. The remote source may send instructions, data collection requests, functionality changes, and/or other information to the device.

SUMMARY

In accordance with the present disclosure, there is provided a retrofit dispenser monitor comprising:

a connector configured to connect the dispenser monitor directly to a dispenser;

a sensor configured to detect the attached dispensing action of the attached dispenser;

a controller connected to the sensor, the controller being configured:

to learn characteristics of a data signature corresponding to a dispensing action of the attached dispenser; and to recognize subsequent data signatures received from the sensor which correspond to the learned characteristics in order to determine a measure of dispenser use; and a transmitter configured to transmit data relating to the determined measure of dispenser use.

The data signature may be considered to be a characteristic trace or sign that indicates the occurrence of a physical process or event. The controller may learn characteristics by identifying particular features of the received sensor data which correspond to a particular process or event (e.g. forming at least part of a dispensing action).

The measure of dispenser use may depend on the particular dispenser and/or product being dispensed. For example, a measure of dispenser use may correspond to the number of dispense actions (e.g. the number of times a user removes paper from a dispenser regardless of how much paper is taken). A measure of dispenser use may correspond to the quantity of product dispensed (e.g. where the quantity of paper is recorded).

The connector may be a releaseable connector. The connector may comprise an adhesive area; a clamp (e.g. a hose clamp, bulldog clip) or a magnet. The connector may comprise a lock. It will be appreciated that other fasteners may be used. The connector may be configured not to require the dispenser to be modified (e.g. avoiding drilling to accommodate screws).

The sensor may comprise one or more of: a vibration sensor; a heat sensor; a light sensor; an electromagnetic interference (EMI) sensor (such as an antenna, e.g. to detect actuations or dispenses by monitoring the EMI produced by a motor in the dispenser); a sound sensor; a volume sensor; a motion sensor; and an orientation sensor.

The controller may be configured to distinguish between a plurality of dispensing actions based on the received data signature.

The controller may be configured to predict characteristics of the next data signature based on previous (e.g. the most recent) recognized signatures.

The controller may be configured to determine whether the dispenser has been refilled based on received data.

The controller may be configured to determine whether the dispenser has been refilled based on detecting a data signature corresponding to a refill action.

The controller may be configured to determine whether the dispenser has been refilled based on detecting a data signature corresponding to a full dispenser.

The controller may be configured to determine whether the dispenser has been refilled based on a user interaction.

The signature characteristics may comprise one or more of: duration of dispensing; frequency of vibration during dispensing; and temperature profile during dispensing.

The dispenser may comprise one or more of: a soap dispenser; a sanitizer dispenser; a paper towel dispenser; a urinal; and a toilet.

The dispenser monitor may be configured to:
compare a received signature with a library of signatures of known dispensers; and
determine the type of the attached dispenser based on the comparison.

The dispenser monitor may comprise a universal asynchronous receiver/transmitter configured to allow the dispenser monitor to communicate with a remote device. A remote device may comprise a processor, a receiver, a memory and computer program code. A remote device may also comprise a transmitter.

The dispenser monitor may comprises a magnetic sensor, and the dispenser monitor may be configured not to record or detect signatures (e.g. suspend recording or detection) while the magnetic sensor is detecting a particular magnetic field.

The transmitter may comprise one or more of: a wireless transmitter; a wired transmitter; a Bluetooth® transmitter; an IR transmitter; a cellular transmitter; a WiFi transmitter; and a radio-frequency transmitter.

According to the present disclosure, there is also provided a system comprising a plurality of retrofit dispenser monitors as described herein, wherein each retrofit dispenser monitor is attached to a spatially separated dispenser and is configured to transmit use data to the same remote device. For example, one dispenser monitor may be attached to a urinal, whereas another dispenser monitor in the same system may be attached to a spatially separate paper towel dispenser.

According to the present disclosure, there is also provided a system comprising:
a plurality of retrofit dispenser monitors as described herein;
a remote electronic device having a receiver configured to receive data from each of the transmitters relating to the determined measure of dispenser use
wherein the remote electronic device is configured to provide a notification when the dispensers require refilling.

The remote electronic device may be a portable electronic device.

According to a further aspect, there is provided a retrofit dispenser monitor comprising:
a connector configured to connect the dispenser monitor directly to a dispenser;
a sensor configured to detect the attached dispensing action of the attached dispenser;
a controller connected to the sensor, the controller being configured:
compare received sensor data with a library of signatures of known dispensers; and
determine the type of the attached dispenser based on the comparison; and
to recognize subsequent data signatures received from the sensor which correspond to the determined dispenser type in order to determine a measure of dispenser use; and
a transmitter configured to transmit data relating to the determined measure of dispenser use.

According to a further aspect, there is provided a method, the method comprising:
connecting a dispenser monitor directly to a dispenser;
detecting the attached dispensing action of the attached dispenser;
learning characteristics of a data signature corresponding to a dispensing action; and
recognizing subsequent data signatures which corresponds to the learned characteristics in order to determine a measure of dispenser use; and
transmitting data relating to the determined measure of dispenser use.

According to a further aspect, there is provided a method, the method comprising:
connecting a dispenser monitor directly to a dispenser;
detecting the attached dispensing action of the attached dispenser;
comparing received sensor data with a library of signatures of known dispensers;
determining the type of the attached dispenser based on the comparison; and
recognizing subsequent data signatures which correspond to the determined dispenser type in order to determine a measure of dispenser use; and
transmitting data relating to the determined measure of dispenser use.

According to a further aspect, there is provided a computer program, the computer program comprising computer code configured, when run on a processor in a dispenser monitor connected directly to a dispenser:
to enable detection of the attached dispensing action of the attached dispenser;
to learn characteristics of a data signature corresponding to a dispensing action; and
to recognize subsequent data signatures which corresponds to the learned characteristics in order to determine a measure of dispenser use; and
to enable transmission of data relating to the determined measure of dispenser use.

According to a further aspect, there is provided a computer program, the computer program comprising computer code configured, when run on a processor in a dispenser monitor connected directly to a dispenser:

to enable detection of the attached dispensing action of the attached dispenser;

to compare received sensor data with a library of signatures of known dispensers;

to determine the type of the attached dispenser based on the comparison; and to recognize subsequent data signatures which correspond to the determined dispenser type in order to determine a measure of dispenser use; and to transmit data relating to the determined measure of dispenser use.

The connector (e.g. a magnet; an adhesive and/or a custom connector) may enable a direct physical connection between the dispenser and the attached dispenser monitor.

A dispenser may be considered to be a container, package, device, or vending machine for holding and dispensing a product in small amounts. The dispenser may be configured to dispense product in response to a user interaction. The dispenser may be configured to allow a plurality of dispenses before the available product is depleted. The product may be dispensed in discrete units such as paper cups or paper towels. The product may be dispensed as a continuous flow, such as sugar, water or coffee.

A dispenser may also encompass devices configured to consume a portion or fractional part of a stored product in response to a user interaction. For example, a urinal may dispense water and consume deodorizer in response to the user flushing. Or a camping stove may be configured to consume gas in response to being turned on. A dispenser may also encompass devices configured to distribute product from a remote or central supply. For example, a water dispenser may not have an integral container but be plumbed into the mains to supply portions of water to a user.

A retrofit dispenser monitor may be a dispenser monitor capable of being retrofitted to a dispenser to monitor dispensing actions of that dispenser.

A controller may comprise a processor (e.g. a central processing unit, a microprocessor, an application-specific integrated circuit or ASIC or a multicore processor). The controller may comprise memory (e.g. flash memory, a hard-drive, volatile memory). The controller may be configured to run computer program code (e.g. stored on the memory) configured to allow the controller to learn or recognize dispense signatures. The computer program code may be stored on a non-transitory medium such as a CD or DVD.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

FIGS. 1b and 1c are front and rear perspective views of the retrofit dispenser monitor of FIG. 1a.

FIG. 1f is a front view of a water dispenser in conjunction with the dispenser monitor of FIG. 1a.

FIG. 2b is a graph showing how the frequency of the dispense actions change as the soap is depleted from the soap dispenser of FIG. 2a.

DETAILED DESCRIPTION

With reference to the figures, a retrofit dispenser monitor is disclosed. The dispenser monitor has a connector allowing it to be connected directly to one of a number of dispensers. The dispenser monitor also comprises a sensor configured to detect the dispensing action of the attached dispenser by learning the characteristics of the dispensing action. Information corresponding to the dispensing action is then transmitted on to a remote location which allows the use of the dispenser to be monitored.

In the context of this invention, dispensers are typically used in a variety of settings, and perform a number of roles. In each case, a dispenser is generally an automatic machine or container that is designed to release a specific amount of something. That is, an advantage of using a dispenser is that it helps reduce the amount of manpower required to distribute goods to individuals. However, generally dispensers are provided with a finite quantity of product to dispense, and the time taken to dispense this quantity depends on the frequency of use by the end users of the dispenser.

This means that such dispensers must be monitored in some way to ensure that the product for dispensing is replenished when stocks get low. One way of doing this is manually sending a person to inspect product levels at regular intervals. This increases the manpower required to maintain the dispensers in operation. This is particularly important where there may be a large number of dispensers (e.g. in a public washroom with a number of soap dispensers and paper towel dispensers).

Another option is to use dispensers which have built-in monitors. These monitors may comprise sensors designed to measure the quantity of product remaining in the dispenser and be configured to provide an alert when the dispenser needs refilled. However, this sort of dispenser monitor is integrally linked to the particular dispenser and cannot be readily retrofitted to other dispensers. Such devices cannot be used in existing dispensers systems without replacing the dispensers themselves.

Therefore, there is a need for a retrofit dispenser which can be used with a variety of different pre-existing dispensers to allow the monitoring of those dispensers whilst mitigating the need for manual inspection.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Figure 1A:
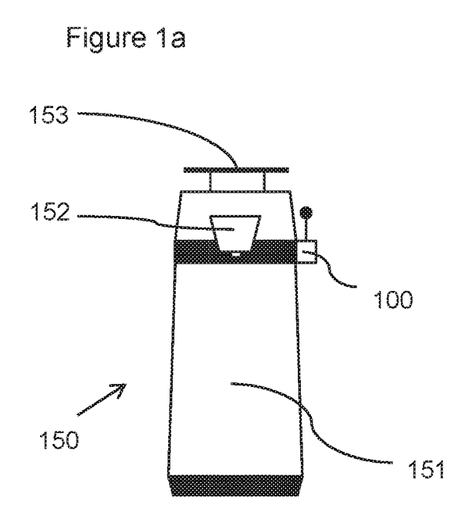
FIG. 1a is a front view of a coffee dispenser with a first embodiment of a retrofit dispenser monitor.

FIG. 1a shows an embodiment of a retrofit dispenser monitor 100 connected to a dispenser 150. In this case, the dispenser is a pump coffee dispenser comprising an insulated vessel 151, a pump having a plunger 153, and an outlet 152. When the user depresses the plunger 153, the dispenser 150 is configured to dispense a portion of coffee (or other liquid) from within the vessel 151 through the outlet 152.

In this case, a retrofit dispenser monitor 100 has been connected to the surface of the dispenser.

Figure 1B:
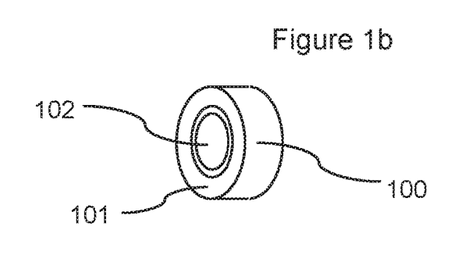
Figure 1C:
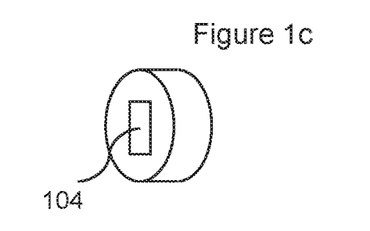

FIGS. 1b and 1c are close-up views of the dispenser monitor 100. FIG. 1b shows an obverse perspective view of the dispenser monitor 100. FIG. 1b shows the connector 101 which is configured to connect the dispenser monitor 100 directly to the dispenser. In this case, the connector 101 comprises a ring of adhesive which allows the dispenser monitor to be stuck to a surface of the dispenser. The connector 101 may have a deformable shape in order for the connector surface to connect securely to dispenser surfaces with different shapes. In this case, the sensor 102 is located within the ring connector 101 to allow physical contact between the sensor 102 and the dispenser. In this case, the sensor is a vibration sensor. It will be appreciated that as vibrations travel through a medium, the sensor can be housed within a body of the dispenser monitor and still be able to detect the vibrations which are transmitted through the body of the dispenser body.

Other embodiments may comprise other sensors such as one or more of: a tilt sensor; a vibration sensor; a shock sensor; an accelerometer; and a magnetic sensor.

A magnetic sensor may allow an engineer to stop and start the main function of the monitor without actually touching the device and therefore collecting only relevant information not distorted by the manipulations during connecting the monitor to UART interface, attaching the monitor to the dispenser, etc. That is, the dispenser monitor may be configured not to record or detect signatures in the while the magnetic sensor is detecting a particular magnetic field (e.g. generated by a magnetic key).

FIG. 1c is a reverse perspective view of the dispenser monitor 100. On this side, the dispenser monitor comprises a transmitter 104 configured to transmit data relating to the determined measure of dispenser use. It will be appreciated the dispenser may also comprise a power source such as a solar panel or battery (e.g. a coin lithium battery).

Figure 1D:
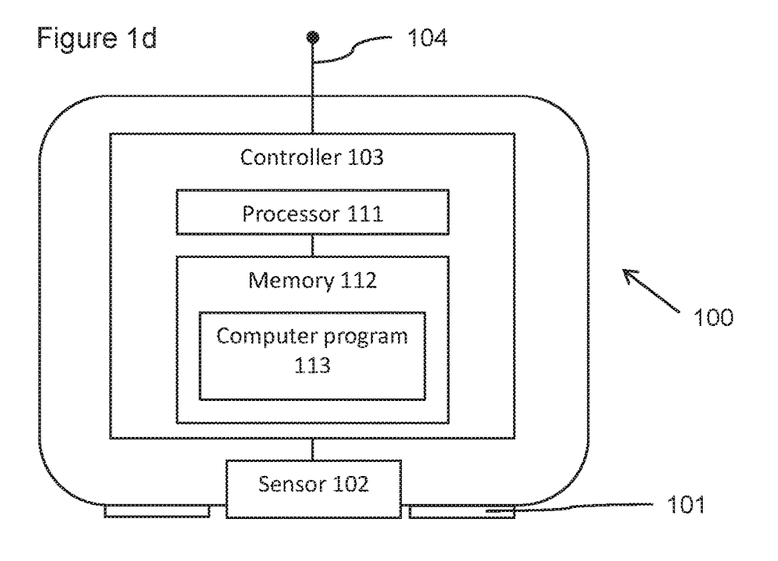
FIG. 1d is a schematic of the components of the dispenser monitor.

FIG. 1d is a schematic of the components of the dispenser monitor module. In this case, the dispenser monitor module comprises:

a connector 101 configured to connect the dispenser monitor directly to a dispenser;

a sensor 102 configured to detect the attached dispensing action of the attached dispenser;

a controller 103 connected to the sensor, the controller being configured
  to learn characteristics of a data signature corresponding to a dispensing action of the attached dispenser; and
  to recognize subsequent data signatures received from the sensor which corresponds to the learned characteristics in order to determine a measure of dispenser use; and a transmitter 104 configured to transmit data relating to the determined measure of dispenser use.

In this case, the controller 103 comprises a processor 111 and a memory 112 having computer program code 113 installed. In this case, the controller is a low power microcontroller with RAM.

In order to learn the characteristics of the data signature corresponding to a dispensing action of the attached dispenser, in this case, the controller 103 is switched into a learning mode. In this case, the controller 103 can be controlled remotely through the transmitter 104 acting as a receiver for commands wirelessly. It will be appreciated that, in other embodiments, the dispenser monitor 100 can be controlled directly using a user interface on the dispenser monitor itself (e.g. via one or more switches and/or a touchscreen).

When the controller 103 is in learning mode, the dispenser monitor is configured to detect vibration signatures and associate those vibration signatures with dispensing actions. For example, the dispenser monitor 100 (or associated device such as a portable electronic device in communication with the dispenser monitor) may prompt the user to dispense a number of times (e.g. three times in succession). The controller will look for three vibration signatures which have similar characteristics. The characteristics may include, for example: duration, average vibration frequency, and/or vibration frequency profile.

In this case, the controller 103 is then configured to generate a characteristics envelope so that if a signature is received which is within the characteristics envelope, it will be recognized and identified as a dispensing action.

The parameters delimiting the characteristics envelope may be based on the variation in the dispensing actions performed in the learning mode. The range of the characteristics envelope may be related to the variance in the vibrations signatures detected during a learning mode. For example, if the duration of the dispensing actions during the learning mode were 1 second; 2 seconds and 1.5 seconds, the controller may determine that the characteristics envelope should encompass vibration signatures of between 0.5 seconds and 3 seconds. However, if the duration of the dispensing actions during the learning mode were 1 second; 1.1 seconds and 1.3 seconds, the controller may determine that the characteristics envelope should encompass vibration signatures of between 0.8 seconds and 1.5 seconds. This may allow the dispenser monitor to reduce the number of false positives where the signatures corresponding to a dispensing action are more consistent.

It will be appreciated that because the dispenser monitor 100 learns the vibration signal, the position of the dispenser monitor is not crucial to the operation of the dispenser monitor. That is, although the vibration signature of a dispensing action may be different depending on whether, for example, the dispenser monitor is attached to the top or bottom of the dispenser, any differences will be accommodated when the device learns the particular dispense signature corresponding to the attachment position.

The controller 103 is then, in this case, configured to switch from learning mode to an operational mode. The switch from learning mode to operational mode may be based on one or more of the following: a predetermined time threshold being exceeded (e.g. 30 seconds); the requisite number of dispensing actions being detected; and the user providing a switch command to the controller.

In this case, when in the operational mode, the controller is configured to be in low power sleep mode until one of the sensors is tripped by a user action (e.g. maintenance or dispense). That is this embodiment is configured such that the sensor wakes up the controller from its sleep mode.

Throughout the event (dispense or maintenance) the controller stores in its memory the signals coming from all the sensors to collect the signature of the event. By analyzing the signature the controller is able to differentiate the event as a dispense or maintenance event or as a should-be ignored mechanical disturbance caused by noise, people traffic, etc.

Figure 1E:
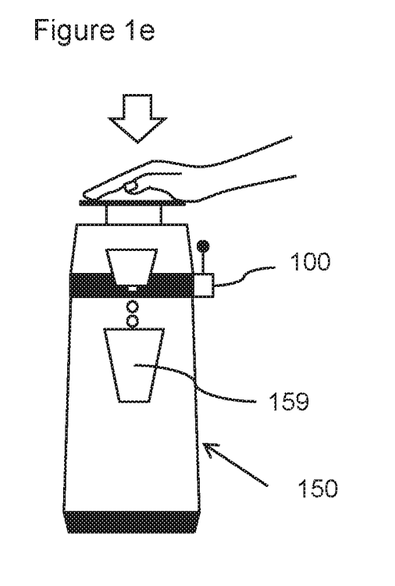
FIG. 1e is a front view of the coffee dispenser of FIG. 1a in use.

When in the operational mode, the dispenser monitor 100 is configured to monitor data received from the sensor 102 and to recognize subsequent data signatures received from the sensor which corresponds to the learned characteristics (e.g. is within the characteristics envelope) in order to determine a measure of dispenser use. For example, the controller may be configured to detect the number of times the dispenser has been activated to dispense, in this case, a cup of coffee 159 (as shown in FIG. 1e). That is, each time a dispenser signature is detected may be associated with a dispense event. The dispense event may be associated with a fixed volume of product (e.g. a 300 ml of coffee; a sheet of paper towel; 10 ml of soap). It will be appreciated that in other cases, the dispense event and the measure of dispenser use may be associated with a quantity of product (e.g. volume or number) based on the received dispense signature. For example, a recognized signature with a long duration may be associated with a larger quantity than a dispense signature with a short duration. This association may take place at the controller or at a remote device configured to receive data from the transmitter of the dispenser monitor.

The controller 103 is configured to control the transmitter 104 to transmit data relating to the determined measure of dispenser use. In this case, the dispenser monitor is configured to transmit an indication to a remote server periodically. That is, there may be a predetermined schedule for transmitting dispenser data (e.g. once a day, once a week). This may reduce the energy consumption of the transmitter. This allows a remote user to monitor how the dispenser is being used.

In this case, the dispenser monitor comprises a UART (universal asynchronous receiver/transmitter) interface configured to allow the controller to communicate with a remote device (e.g. PC) to, for example, upload the collected event information or download new signature data, programming information, new firmware, etc. It will be appreciated that other embodiments may allow the dispenser to be monitored in real time (e.g. transmitting data each time the dispenser is used).

Other embodiments may not use real-time monitoring. For example, the dispenser monitor may transmit data to a nearby "remote server" that's within range via Bluetooth (or similar technology). When the service person arrives, the "remote server" (or the dispenser monitors themselves) may connect with their cell phone (or other longer-range transmitter) and use the connection to send the data collected to the cloud or to a central server. Such non-real-time systems mentioned may reduce hardware and implementation costs.

In other embodiments, the dispenser monitor 100 may be configured to store data relating to use and to transmit data upon request from the user. In other embodiments, the dispenser monitor may be provided with a quantity value corresponding to the number of dispensing actions or amount of product which can be taken before the product which is being dispensed will be exhausted. For example, in a coffee dispenser, the dispenser monitor may be provided with the volume of coffee in the dispenser and the volume of coffee dispensed in each dispensing action. In this case, the dispenser monitor may be configured to send a notification to the remote electronic device (e.g. a remote server) indicating that the volume remaining in the dispenser is 10% (i.e. indicating that the dispenser is almost empty and should be replenished).

Figure 1F:
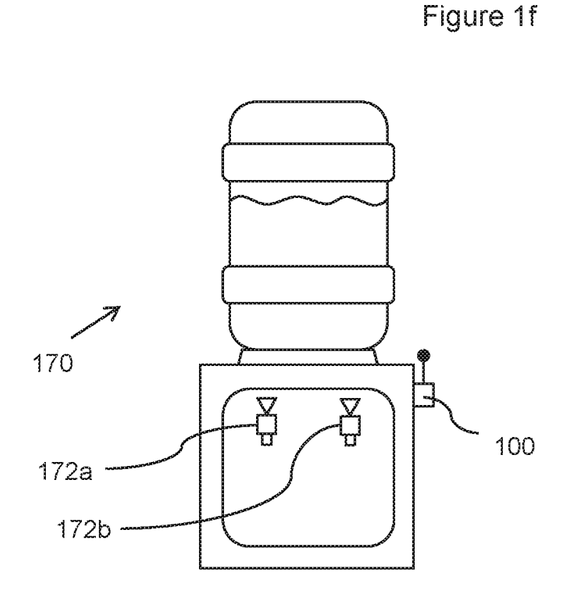

In this case, the connector 101 is a releasable connector allowing the dispenser monitor module to be removed from one dispenser 150 and re-used with another dispenser. In this case, the user can simply pull the dispenser monitor away from the coffee dispenser and reattach the dispenser monitor to, for example, a water dispenser 170 as shown in FIG. 1f. The releasable connector may be configured such that when removed, the dispenser is unchanged from its state before the dispenser was attached (e.g. no drill holes or damage).

When the dispenser monitor has been reattached, the dispenser monitor can learn the dispense signature corresponding to the water dispenser by being put into the learning mode again. Once this is done, the dispenser monitor can monitor water dispenses rather than coffee dispenses.

In the water dispenser case, there are two outlets 172a, 172b, each of which can be activated for various durations in order to dispense more or less water. Each outlet 172a, 172b may correspond to a different dispense signature (e.g. different frequency or amplitude). Multiple dispense signatures may also occur where a dispenser is configured to perform multiple functions (e.g. a coffee machine configured to dispense an espresso or a cappuccino on demand; or a combined soap and water dispenser). In this case, the dispenser monitor 100 is configured to recognize water being dispensed from either outlet as a dispense event. This may be enabled by using both outlets 172a, 172b during the learning phase. For example, if four dispenses were requested, the user could perform two dispenses with one outlet 172a and two dispenses with the other outlet 172b. In response, the dispenser monitor 100 would create a characteristics envelope which encompasses dispensing through either outlet 172a, 172b.

It will be appreciated that, in some embodiments, it may be possible to distinguish between different functions (dispensing an espresso shot and dispensing an Americano). For example, the controller may be configured to receive information relating to a plurality of functions which the device can perform. Then a learning phase would be performed for each of the various functions which would associate a particular characteristics envelope for each function (e.g. a short duration vibration for an espresso and a long duration vibration for an Americano). In cases where the multiple characteristics envelopes did not overlap, any received dispense signature could be associated with the corresponding dispense function.

In this case, the dispense signature could be limited to a subset of the detectable parameters (e.g. vibration frequency and vibration amplitude). The duration of the vibration in this case may then be used as an indication of the volume of water dispensed. For example, the duration of the vibration may be proportional to the volume of water dispensed. This data can then be stored in the controller or transmitted to a remote electronic device by the transmitter to give an indication of the volume of water consumed.

Important elements which allow the retrofit dispenser monitor 100 to function as a 'universal' dispenser monitor (i.e. a monitor that can be used with many different dispenser types) include that the connector 101 is suitable for connection to a variety of devices. In this case, the dispenser monitor can be connected to any surface of the dispenser. Another feature which is important in this regard is that the dispenser monitor 100 is configured to learn the signature from the dispenser 150, 170. This means that the location of the dispenser monitor 100 is not critical (so long as it can detect the dispense signatures) because any variations in dispenser signature due to the variation in position of the dispenser monitor will be accounted for because the dispenser monitor will simply learn the appropriate dispense signature corresponding to its current location. Another important factor is that the sensor is configured to sense features of the dispense event which are distributed (e.g. vibration or heat signatures). For example, in contrast with detecting the level of product remaining (which would require a sensor to be placed in a specific place within the dispenser container), the present dispenser monitor can detect the dispense events from a location on the dispenser removed from the dispense mechanism or dispenser container.

It will be appreciated that some embodiments may be pre-configured to recognize known devices, such a soap dispenser, toilet, urinal, paper towel dispensers.

For example, knowing the devices the dispenser monitor would be retrofitted on, the dispenser monitor may come pre-programmed with a "library" of signatures of known dispensers. This library would be created as part of the development efforts and would allow the dispenser monitor to figure out what it was attached to by comparing the signature of the dispenser it is attached to with the signatures in its library.

That is, some embodiments of the dispenser monitor (e.g. for bathroom dispensers) may not have to "learn" because the dispenser monitor has already been "taught" or pre-programmed. This is a "stick on" and walk away type device. This device may require less effort on the installer's part (e.g. mitigating the need for a learning stage).

Figure 2A:
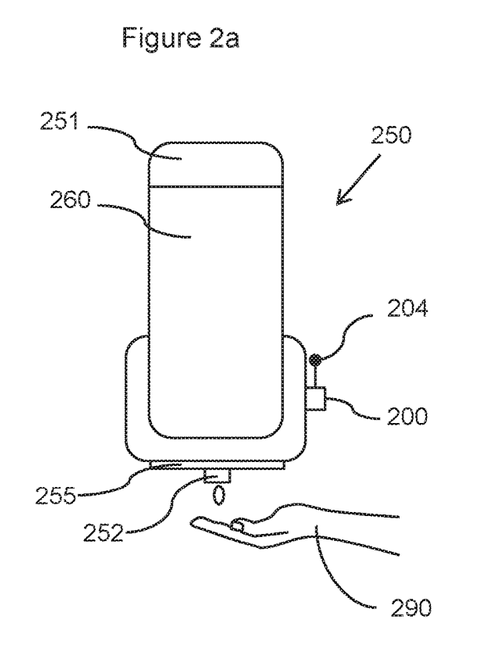
FIG. 2a is a front view of a soap dispenser in use with a second embodiment of a retrofit dispenser monitor.

FIG. 2a shows a second embodiment 200 of a dispenser monitor comprising:
a connector configured to connect the dispenser monitor 200 directly to a dispenser 250;
a sensor configured to detect the attached dispensing action of the attached dispenser;
a controller connected to the sensor, the controller being configured
to learn characteristics of a data signature corresponding to a dispensing action of the attached dispenser; and
to recognize subsequent data signatures received from the sensor which corresponds to the learned characteristics in order to determine a measure of dispenser use; and
a transmitter 204 configured to transmit data relating to the determined measure of dispenser use.

In this case, the controller comprises a BLE (Bluetooth low energy) module. The BLE (Bluetooth Low Energy) module, in this example, is a dual function module that performs the functions of the low power microcontroller and RF radio to communicate with a mobile phone app and BLE enabled gateway In this case, the dispenser monitor is attached to a soap dispenser which can be activated by the user placing their hand 290 below a remote sensor 255. Using a retrofit dispenser monitor may be particularly useful in dispensers with remote activation because the dispense signatures in such dispensers may be more consistent as they are not affected by contact with the user.

The dispenser in this case comprises a container 251 which holds a quantity of soap 260 for dispensation in portions. In this case, the dispensed portions of soap have a predetermined and consistent volume.

However, in this case, because the mass of the soap 260 is a significant proportion of the mass of the dispenser 250, as the stored soap 260 diminishes, the characteristics of the vibration may change. For example the frequency of vibration may increase towards the end of the stored soap 291.

In this case, the dispenser monitor 200 is configured to record changes in the dispense signatures over time to more accurately detect future dispense signatures. That is, the dispenser monitor is simultaneously learning and detecting.

Figure 2B:
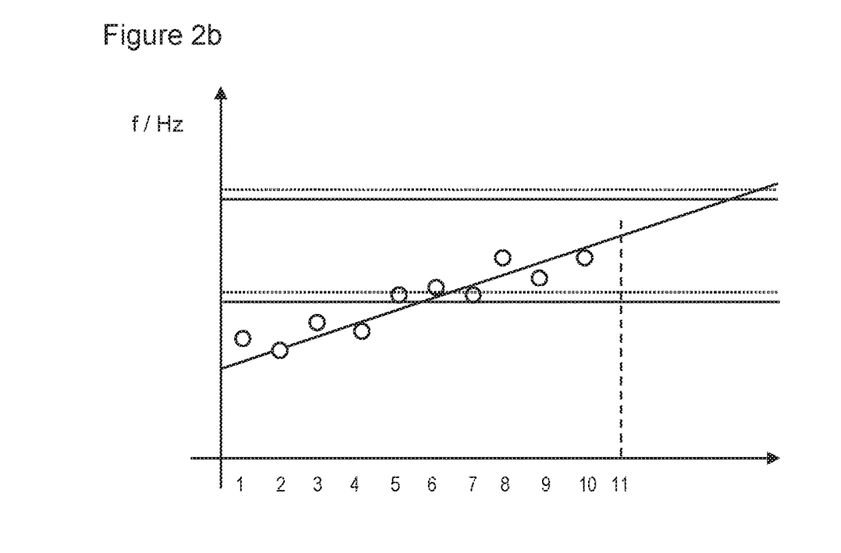
Figure 2C:
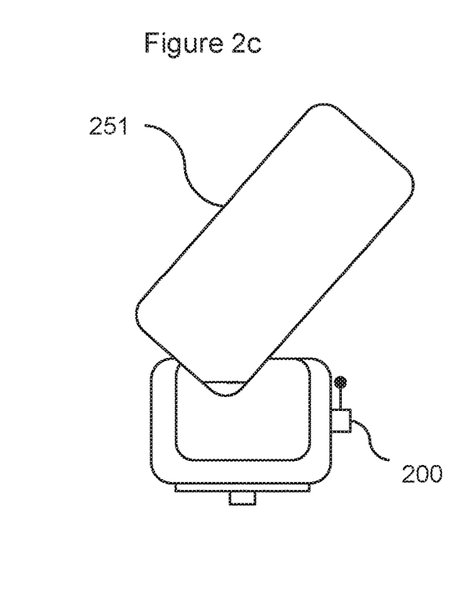
FIG. 2c is a front view of the soap dispenser of FIG. 2a during refilling.

In this case, the dispenser monitor is configured to monitor the variation of characteristics of the dispense signatures as a function of number of dispenses and identify trends in the dispense signatures. For example, as shown in FIG. 2b, in this case, the vibrational frequency of the last 10 dispenses (shown as circles) of this dispenser has been steadily increasing as the soap level goes down. In this case, the controller is configured to adjust the characteristics window by a frequency interval corresponding to the average increase in frequency for each of the last 10 dispenses. In FIG. 2b, the vibration characteristics window for the $10^{th}$ dispense is shown in solid horizontal lines. After the $10^{th}$ dispense has been detected, the vibrational characteristics window is adjusted accordingly for the $11^{th}$ dispense and is shown in FIG. 2c as dotted horizontal lines. This may help improve accuracy and reduce the incidences of false positives by using a narrower characteristics window for each dispense. That is, the characteristics window would need to be much wider to be able to detect all of the dispense vibrational signatures shown in FIG. 2b and so this wider characteristics window may incorrectly recognize incidental vibrations as corresponding to dispense actions.

It will be appreciated that other effects may cause a change in the dispense signature from the dispenser (e.g. a depleting battery powering the dispenser may cause a drift in the vibrational signature).

As well as allowing the apparatus to more accurately recognize a dispense signature, changes in the vibrational signature may also allow the dispenser monitor to monitor the status of the device. For example, the dispense signature may be used to determine whether the battery in the dispenser needs to be replaced.

In certain embodiments (e.g. such as the soap dispenser with an integral container for the dispensable product), refilling the dispenser may result in a step change in the dispense signature. The apparatus may be configured to recognize a refill in order to change the characteristics window to correspond to a full dispenser.

In this case, refilling the dispenser involves removing the empty container as shown in FIG. 2c, and inserting a new full container (or refilling the empty container and reinserting it in the dispenser).

In this case, the dispenser monitor 200 is configured to look for signatures corresponding to two distinct characteristics windows. The first characteristics window corresponds to the predicted next dispense based on previous dispenses as described above, and the second characteristics window corresponds to the window around the expected signature corresponding to a full dispenser (e.g. this may correspond to the first learned signature, or a signature defined by the user as corresponding to a full dispenser). When a new dispense signature (or multiple signatures) falls outside the predicted characteristics window but within the full dispenser characteristics window, the dispense monitor is configured to recognize that the dispenser has been refilled. In response, the predicted characteristics window will be reset and determined based on the signatures received since the refill.

Another approach would be to have a reset button on the dispenser monitor which would be activated by the user each time the dispenser is refilled. In response to activation of the reset button, the dispenser button could prompt the user to initiate a learning protocol (e.g. prompt the user to initiate a predetermined number of dispenses) or reset to a previously learned characteristics window corresponding to a fill dispenser.

Other embodiments may be configured to recognize the refill step. For example, the dispenser may be configured to recognize the vibration signature of the dispenser being refilled by learning the characteristic signature of a refilling action in an analogous way to how the dispense action is learned. For example, the dispenser monitors may be configured to recognize a large amplitude vibration as corresponding to a refill step. Other dispenser monitors may be configured to be located within the housing of the dispenser and recognize an increase in light levels as being associated with a refill. Other dispenser monitors may be configured to be located on the refill container and be configured to detect movement of the container itself and/or being detached from the container and reattached to the refill contains as corresponding to a refill. Some dispenser monitor may use a combination of these approaches.

In other embodiments, the dispenser monitor may comprise multiple different sensors. For example, a dispenser monitor may comprise a vibration sensor and a heat sensor. Using multiple sensors may increase accuracy and help distinguish between different dispense events. For example, in a coffee machine, making and dispensing a coffee shot may be recognized by detecting a characteristic vibration and heat signature. That is, the heat signature may be a good discriminator between a coffee shot dispensing event and a refill event.

It will be appreciated that multiple dispensers may transmit data to the same central hub (e.g. comprising an electronic device such as a server). This may allow the replenishing of supplies and servicing of the multiple dispensers to be coordinated. For example, in a public washroom environment, the various dispensers may have been used to different degrees. This would allow the washroom attendant to take the appropriate supplied when going to refill the washroom dispensers.

Figure 3:
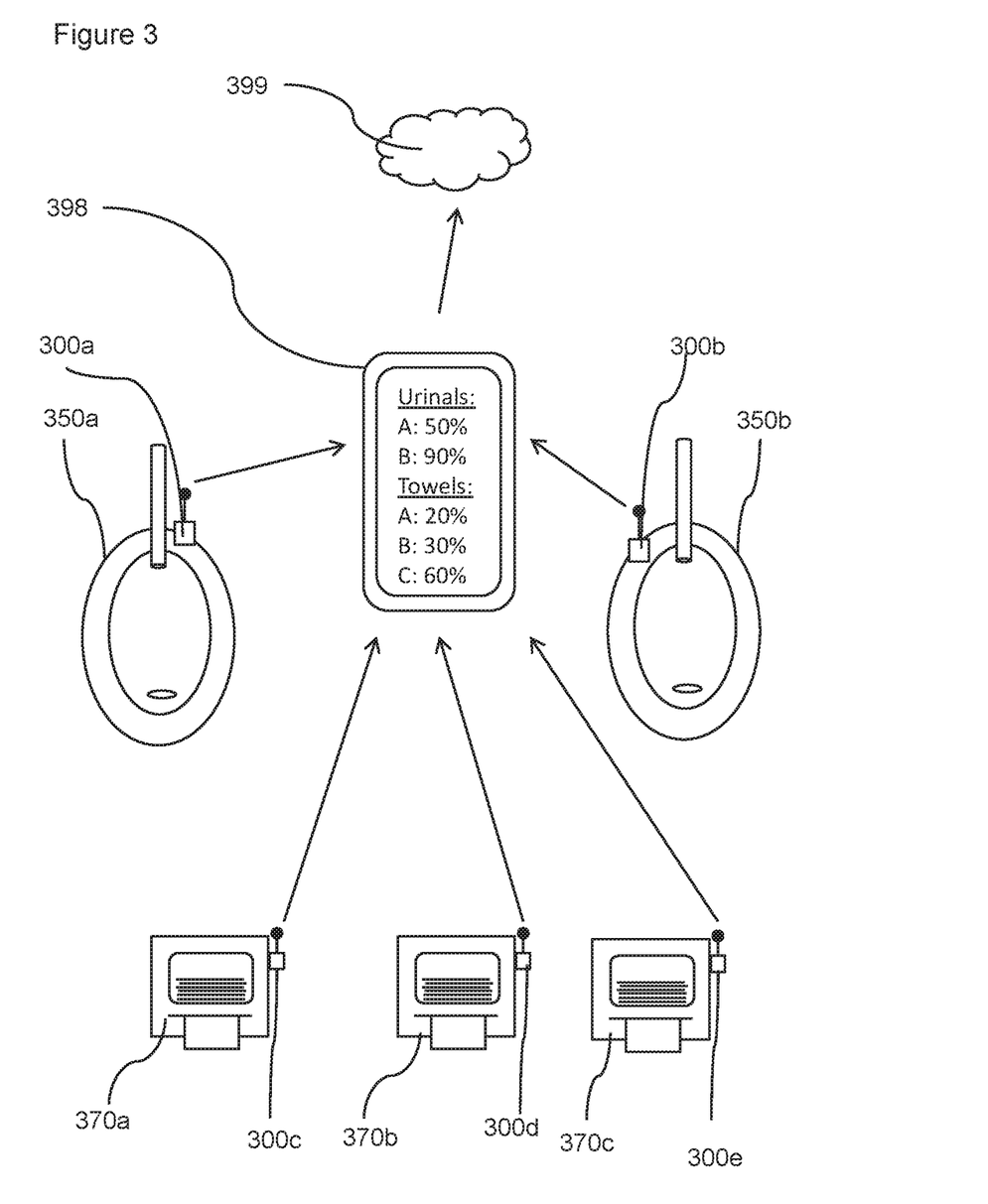
FIG. 3 is a schematic of a plurality of dispensers with associated dispenser monitors transmitting data to a remote device.

This is shown in FIG. 3 which is a schematic of an embodiment of a system comprising a plurality of retrofit dispenser monitors 300a-e; and a remote electronic device 398 having a receiver configured to receive data from each of the transmitters relating to the determined measure of dispenser use/

In this case, each dispenser monitor is attached to a respective dispenser 350a-b, 370a-c. The dispensers in this case comprise two urinals 350a-b and three paper towel dispensers 370a-c.

The remote electronic device in this case is a portable electronic device such as a mobile phone or tablet computer. These can be carried by the washroom attendant and, in this case, is configured to wirelessly connect with each of the dispenser monitors within a washroom to allow transmission of dispense action data. The data can be displayed on a display of the remote device to allow the user to review the status of each of the dispensers. In this case, the remote device is configured to display the proportion of product remaining.

The portable electronic device in this case is configured to forward this data on to the cloud 399. It will be appreciated that other systems may be configured to allow sharing of data between computers or servers. The remote device may be used to control each of the dispenser monitors. For example, the remote device may be used to switch the dispenser monitor to a learning mode or to reset the dispenser monitor after a refill or battery change.

In other embodiments, there may be a local remote device nearby to a plurality of dispensers to collate and aggregate data from the dispensers within range. For example, there may be a local "remote device" in the washroom that talks to all the washroom dispensers. In this case, instead of the service person connecting to each dispenser with his mobile phone or other portable device, he only connects to the local "remove device", which has all the information collected by the dispenser monitors.

That is, there are at least three ways to access data collected by the dispenser monitors:

(1) Dispenser monitors each connect directly to service person's portable electronic device (e.g. mobile phone). The portable electronic device may then send data to the cloud.

(2) Dispenser monitors each connect to local "remote device" in washroom. Service person's electronic device (e.g. mobile phone or other portable device) then connects to local "remote device" (e.g. when the service person is within range). The portable electronic device may then send data to the cloud.

(3) Dispenser monitors connects to local "remote device" in washroom. The local "Remote device" may then send data directly to the cloud.

It will be appreciated that this list is not exhaustive as there are potentially more ways to get data to the cloud (e.g. each device could be an "Internet of Things" device).

In other embodiments, the remote electronic device may be configured to provide a notification when the dispensers require refilling (e.g. an email, a text message, an audio alarm or visual alarm).

It will be appreciated that data received by the remote electronic device may be aggregated over time and processed to generate reports for end-users.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A retrofit dispenser monitor comprising:
   a connector configured to connect the dispenser monitor directly to a dispenser body of a dispenser such that there is physical contact between the dispenser monitor and the dispenser;
   a sensor configured to detect the attached dispensing action of the attached dispenser;
   a controller connected to the sensor, the controller being configured:
      to learn characteristics of a data signature which is transmitted through the body of the dispenser directly to the physically connected dispenser monitor and which corresponds to a dispensing action of the attached dispenser; and
      to recognize subsequent data signatures received from the sensor which corresponds to the learned characteristics in order to determine a measure of dispenser use; and
   a transmitter configured to transmit data relating to the determined measure of dispenser use.

2. The monitor according to claim 1, wherein the connector is a releaseable connector.

3. The monitor according to claim 1, wherein the connector comprises an adhesive area; a clamp or a magnet.

4. The monitor according to claim 1, wherein the sensor comprises one or more of: a vibration sensor; a heat sensor; a light sensor; an electromagnetic interference sensor; a sound sensor; a volume sensor; a motion sensor; and an orientation sensor.

5. The monitor according to claim 1, wherein the controller is configured to distinguish between a plurality of dispensing actions based on the received data signature.

6. The monitor according to claim 1, wherein the controller is configured to predict characteristics of the next data signature based on the most recent recognized signatures.

7. The monitor according to claim 1, wherein the controller is configured to determine whether the dispenser has been refilled based on received data.

8. The monitor according to claim 7, wherein the controller is configured to determine whether the dispenser has been refilled based on detecting a data signature corresponding to a refill action.

9. The monitor according to claim 8, wherein the controller is configured to determine whether the dispenser has been refilled based on detecting a data signature corresponding to a full dispenser.

10. The monitor according to claim 1, wherein the controller is configured to determine whether the dispenser has been refilled based on a user interaction.

11. The monitor according to claim 1, wherein the signature characteristics comprise one or more of: duration of dispensing; frequency of vibration during dispensing; and temperature profile during dispensing.

12. The monitor according to claim 1, wherein the dispenser comprises one or more of: a soap dispenser; a sanitizer dispenser; a paper towel dispenser; a urinal; and a toilet.

13. The monitor according to claim 1, wherein the dispenser monitor is configured to:
compare a received signature with a library of signatures of known dispensers; and
determine the type of the attached dispenser based on the comparison.

14. The monitor according to claim 1, wherein the dispenser monitor comprises a universal asynchronous receiver/transmitter configured to allow the dispenser monitor to communicate with a remote device.

15. The monitor according to claim 1, wherein the dispenser monitor comprises a magnetic sensor, and wherein the dispenser monitor is configured to suspend recording or detecting signatures while the magnetic sensor is detecting a particular magnetic field.

16. The monitor according to claim 1, wherein the transmitter comprises one or more of: a wireless transmitter; a wired transmitter; a Bluetooth® transmitter; an IR transmitter; a cellular transmitter; a WiFi transmitter; and a radiofrequency transmitter.

17. A method, the method comprising:
connecting a dispenser monitor directly to a dispenser body of a dispenser such that there is a physical contact between the dispenser monitor and the dispenser;
detecting the attached dispensing action of the attached dispenser;
learning characteristics of a data signature which is transmitted through the body of the dispenser directly to the physically connected dispenser monitor and which corresponds to a dispensing action; and
recognizing subsequent data signatures which corresponds to the learned characteristics in order to determine a measure of dispenser use; and
transmitting data relating to the determined measure of dispenser use.

18. A system comprising:
a plurality of retrofit dispenser monitors according to claim 1;
a remote electronic device having a receiver configured to receive data from each of the transmitters relating to the determined measure of dispenser use
wherein the remote electronic device is configured to provide a notification when the dispensers require refilling.

19. The system of claim 18, wherein the remote electronic device is a portable electronic device.

20. A retrofit dispenser monitor comprising:
a connector configured to connect the dispenser monitor directly to a dispenser body of a dispenser such that there is physical contact between the dispenser monitor and the dispenser;
a sensor configured to detect the attached dispensing action of the attached dispenser by measuring a signature which is transmitted through the body of the dispenser directly to the physically connected dispenser monitor;
a controller connected to the sensor, the controller being configured to:
compare received sensor data with a library of signatures of known dispensers;
determine the type of the attached dispenser based on the comparison; and
recognize subsequent data signatures received from the sensor which correspond to the determined dispenser type in order to determine a measure of dispenser use; and
a transmitter configured to transmit data relating to the determined measure of dispenser use.

* * * * *